US006785650B2

(12) United States Patent
Basson et al.

(10) Patent No.: US 6,785,650 B2
(45) Date of Patent: Aug. 31, 2004

(54) HIERARCHICAL TRANSCRIPTION AND DISPLAY OF INPUT SPEECH

(75) Inventors: Sara H. Basson, White Plains, NY (US); Dimitri Kanevsky, Ossining, NY (US); Benoit Emmanuel Maison, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 09/811,053

(22) Filed: Mar. 16, 2001

(65) Prior Publication Data

US 2002/0133340 A1 Sep. 19, 2002

(51) Int. Cl.[7] .............................................. G10L 21/00
(52) U.S. Cl. ..................................... 704/235; 704/270
(58) Field of Search ............................... 704/235, 240, 704/251, 254, 255, 257, 270

(56) References Cited

U.S. PATENT DOCUMENTS

| | | | | |
|---|---|---|---|---|
| 4,882,757 A | * | 11/1989 | Fisher et al. ................ | 704/253 |
| 5,737,724 A | * | 4/1998 | Atal et al. .................. | 704/251 |
| 5,842,163 A | * | 11/1998 | Weintraub .................. | 704/240 |
| 6,487,534 B1 | * | 11/2002 | Thelen et al. ............... | 704/270 |
| 6,502,073 B1 | * | 12/2002 | Guan et al. .................. | 704/255 |
| 6,526,380 B1 | * | 2/2003 | Thelen et al. ............... | 704/251 |
| 6,567,778 B1 | * | 5/2003 | Chao Chang et al. ...... | 704/257 |

FOREIGN PATENT DOCUMENTS

| EP | 0 924 687 A | 6/1999 |
|---|---|---|
| EP | 0 957 470 A | 11/1999 |

OTHER PUBLICATIONS

Evernmann et al., "Large Vocabulary Decoding and Confidence Estimation Using Word Posterior Probabilities," Proc. of ICASSP 2000.

Mangu et al., "Finding Consensus in Speech Recognition: Word Error Minimization and Other Applications of Confusion Networks," Computer Speech and Lanquage (2000) 14, 373–400.

"Reading Tutor Using an Automatic Speech Recognition," IBM Technical Disclosure Bulletin, IBM vol. 36, No. 8, 287–289 (Aug. 1993).

* cited by examiner

Primary Examiner—Susan McFadden
(74) Attorney, Agent, or Firm—Ryan, Mason & Lewis, LLP; Casey P. August, Esq.

(57) ABSTRACT

Generally, the present invention provides the ability to present a mixed display of a transcription to a user. The mixed display is preferably organized in a hierarchical fashion. Words, syllables and phones can be placed on the same display by the present invention, and the present invention can select the appropriate symbol transcription based on the parts of speech that meet minimum confidences. Words are displayed if they meet a minimum confidence or else syllables, which make up the word, are displayed. Additionally, if a syllable does not meet a predetermined confidence, then phones, which make up the syllable, may be displayed. A transcription, in one aspect of the present invention, may also be described as a hierarchical transcription, because a unique confidence is derived that accounts for mixed word/syllable/phone data.

41 Claims, 8 Drawing Sheets

HIERARCHICAL TRANSCRIPTION AND DISPLAY OF INPUT SPEECH

FIELD OF THE INVENTION

The present invention relates to automatic speech recognition and, more particularly, relates to hierarchical transcription and display of input speech.

BACKGROUND OF THE INVENTION

Transcription of words based on Automatic Speech Recognition (ASR) is a well known method that helps to improve the communication ability of the hearing impaired. A problem with this approach is that if the error recognition rate is relatively high, the transcription is not efficient for hearing impaired children who are still learning a language, as these children can be easily confused by the wrongly decoded words. An approach that addresses this problem is displaying phonetic output rather than words. This approach is, however, not optimal because reading correctly recognized words is easier and more efficient than reading phonetic output.

The use of ASR to teach hearing impaired people to read is also a well known method. In this approach, a reference text is displayed for a user and the ASR decodes the user speech while he or she reads aloud the text and compares the decoded output with the reference text. One reference that explains this use of ASR for this purpose is "Reading Tutor Using an Automatic Speech," Technical Disclosure Bulletin, Volume 36, Number 8, 08-93, pp. 287–290, the disclosure of which is hereby incorporated by reference. A problem with this approach is that any errors in speech recognition will make the user think that he or she has misspoken a word, while the error is actually the fault of the program.

Another problem with ASR occurs in noisy environments, such as occurs with a difficult channel like telephone or when speech is ridden with disfluencies. In these situations, a substantial number of errors is likely to occur. Although errors can sometimes be identified by the user because of the context, the resulting confusion and increased difficulty of interpretation may offset the benefits of word-based display. This is especially true when the user is a child who is in the process of learning the language. In this case, virtually no errors should be allowed.

While this problem is particularly problematic for children who are learning to speak properly, high error rates of ASR are also a general problem. As a person dictates into an ASR system, the system will make transcription decisions based on probabilities, and the decisions may be based on low probabilities. If the user does not immediately catch an incorrect transcription, the correct transcription may be hard to determine, even when the context is known.

Thus, what is needed is a way of limiting or solving the problems of a high recognition error rate when using ASR to improve the communication ability or the reading skills of hearing impaired people or both, or when using the ASR for other speech recognition purposes.

SUMMARY OF THE INVENTION

Generally, the present invention provides the ability to present a mixed display of a transcription to a user. The mixed display is preferably organized in a hierarchical fashion. Words, syllables and phones can be placed on the same display by the present invention, and the present invention can select the appropriate symbol transcription based on the parts of speech that meet minimum confidences. Words are displayed if they meet a minimum confidence or else syllables, which make up the word, are displayed. Additionally, if a syllable does not meet a predetermined confidence, then phones, which make up the syllable, may be displayed. A transcription, in one aspect of the present invention, may also be described as a hierarchical transcription, because a unique confidence is derived that accounts for mixed word/syllable/phone data.

A more complete understanding of the present invention, as well as further features and advantages of the present invention, will be obtained by reference to the following detailed description and drawings.

DETAILED DESCRIPTION OF PREFERRED EMBODIMENTS

The present invention fixes or reduces the problems of the prior art by providing a hierarchical display and transcription of speech, which will make a determination of the most likely part of speech and display that part of speech. In one embodiment, each part of speech has a minimum confidence level or acceptance threshold. Thus, there are word, syllable and phone acceptance thresholds. If a word meets its acceptance threshold, then it is displayed. If it does not meet its acceptance threshold, then each syllable is examined to see if it meets a syllable acceptance threshold. If so, then the syllable or syllables are displayed. If a syllable does not meet the syllable acceptance threshold, then the phone or phones that make up the syllable are displayed.

For example, assume that the recognized word was "embodiment," but that the recognized word had a low confidence that did not meet the acceptance threshold for words. Assuming that the syllables are "em," "bod," "i," and "ment," each of the confidences of these syllables will be compared with the acceptance threshold for syllables. If the confidences of "bod" and "i" are high, then these syllables will be displayed. The syllables "em" and "ment" will be broken into phones and displayed as such. The final display will therefore be similar to "e m 'bod' 'i' m (e) n t."

The present invention has a benefit that a person whose speech is being recognized will be able to tell that there is a higher probability of error for a section of speech, as this section of speech will be replaced by syllables or phones and will not be words. Additionally, because it is likely that some syllables or phones are correct even though the word may be incorrect, the user should be able to better determine the correct word or words that correspond to the syllables or phones.

Most current Automatic Speech Recognition (ASR) systems are designed to convert speech to text. Because of this, these systems will determine probability and confidence measures for words. There are some ASR systems that will convert speech to syllables. With these systems, the probability and confidence measures are based on syllables and not words. While these probability and confidence measures can be used with the present invention, the present invention can also determine a confidence for a mixed speech transcription. This determination can be used to calculate whether a word, its constituent syllables, or their constituent phones are the most reliable transcription of a segment of speech.

Figure 1:
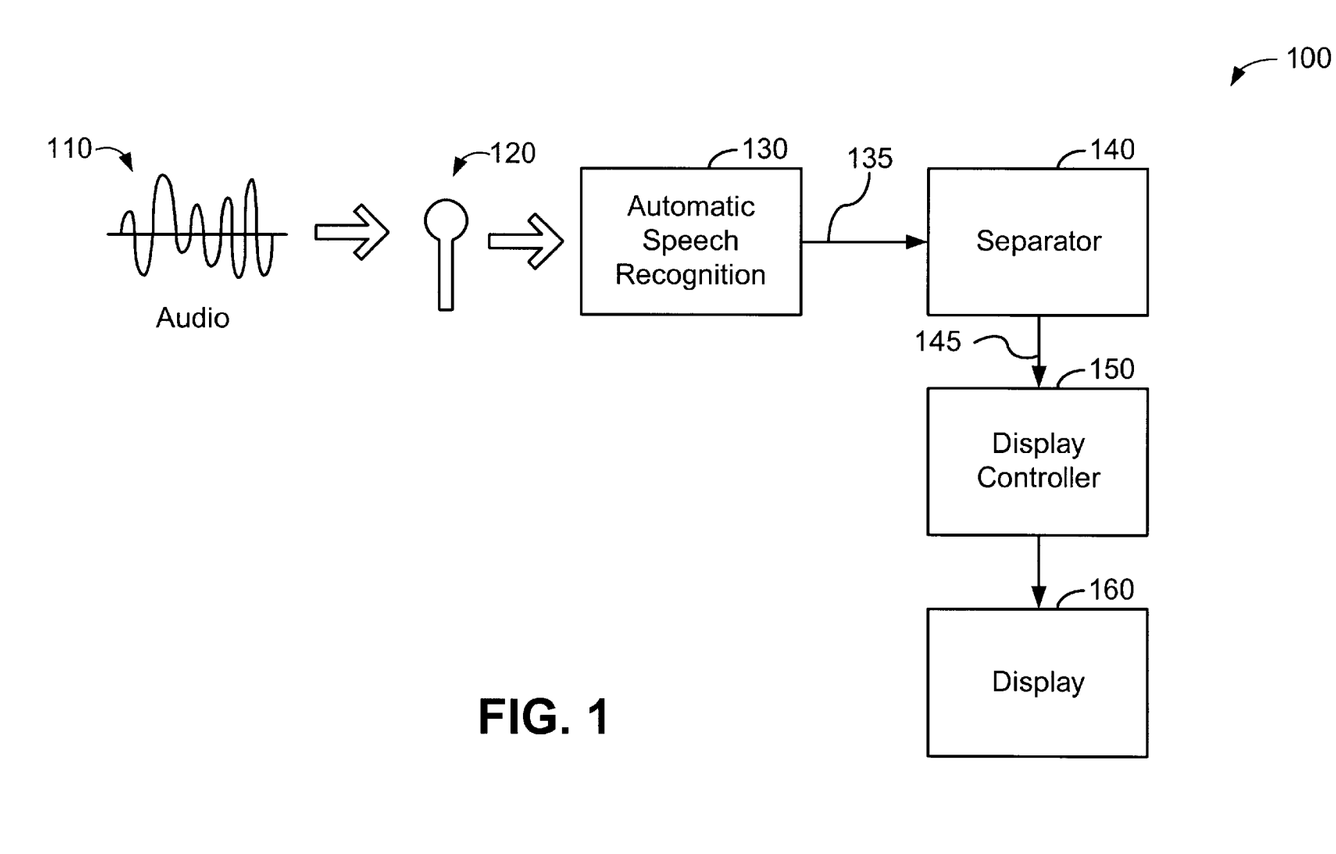
FIG. 1 is a block diagram of an exemplary hierarchical transcription and display system in accordance with one embodiment of the present invention.

Referring now to FIG. 1, this figure shows a block diagram of an exemplary hierarchical transcription and display system 100 in accordance with one embodiment of the present invention. System 100 comprises an ASR module 130, a separator module 140, a display controller module 150, and a display 160. A person (not shown) speaks audio 110 into a microphone 120, and the resultant electrical waveform is operated on by the ASR module 130. ASR module 130 converts the speech to an ASR output 135. ASR output 135 can comprise strings of words or words and syllables, along with start and end times and hypothesis scores for the strings. ASR module 130 is described in more detail in reference to FIG. 2.

The separator module 140 receives the ASR output 135 and separates the output into words and syllables, and optionally phones. The separator module 140 is described in more detail in reference to FIG. 3. The separator output 145 can thus comprise words and syllables, word and syllable confidences, and word and syllable start and end times. Optionally, phones, phone confidences and phone start and stop times may also be added to separator output 145.

Display controller module 150 receives the separator output 145 and displays this output, in a hierarchical manner, on display 160. The display controller module 150 may also optionally control different programmable aspects of system 100. The programmability of and the display controller module 150 itself are explained in more detail in reference to FIG. 4. Various hierarchical display schemes are described in reference to FIGS. 5 through 7.

Generally, system 100 operates in the following manner. A person speaks and creates audio 110 that is converted to electrical signals in microphone 120. These electrical signals are converted by ASR module 130 into a data stream (part of ASR output 135) that contains word or words and syllables. The separator module 140 separates the received data stream into words and syllables, and optionally into phones. The separator module 140 also makes a determination as to the confidence or probability of the syllables or phones and how the parts of speech should be hierarchically transcribed. The display controller 150 uses this information to determine which part of speech is most likely correct and modifies the display 160 to show a hierarchical display of the speech. The hierarchical display can comprise a mixed word, syllable, and phone display.

Figure 2:
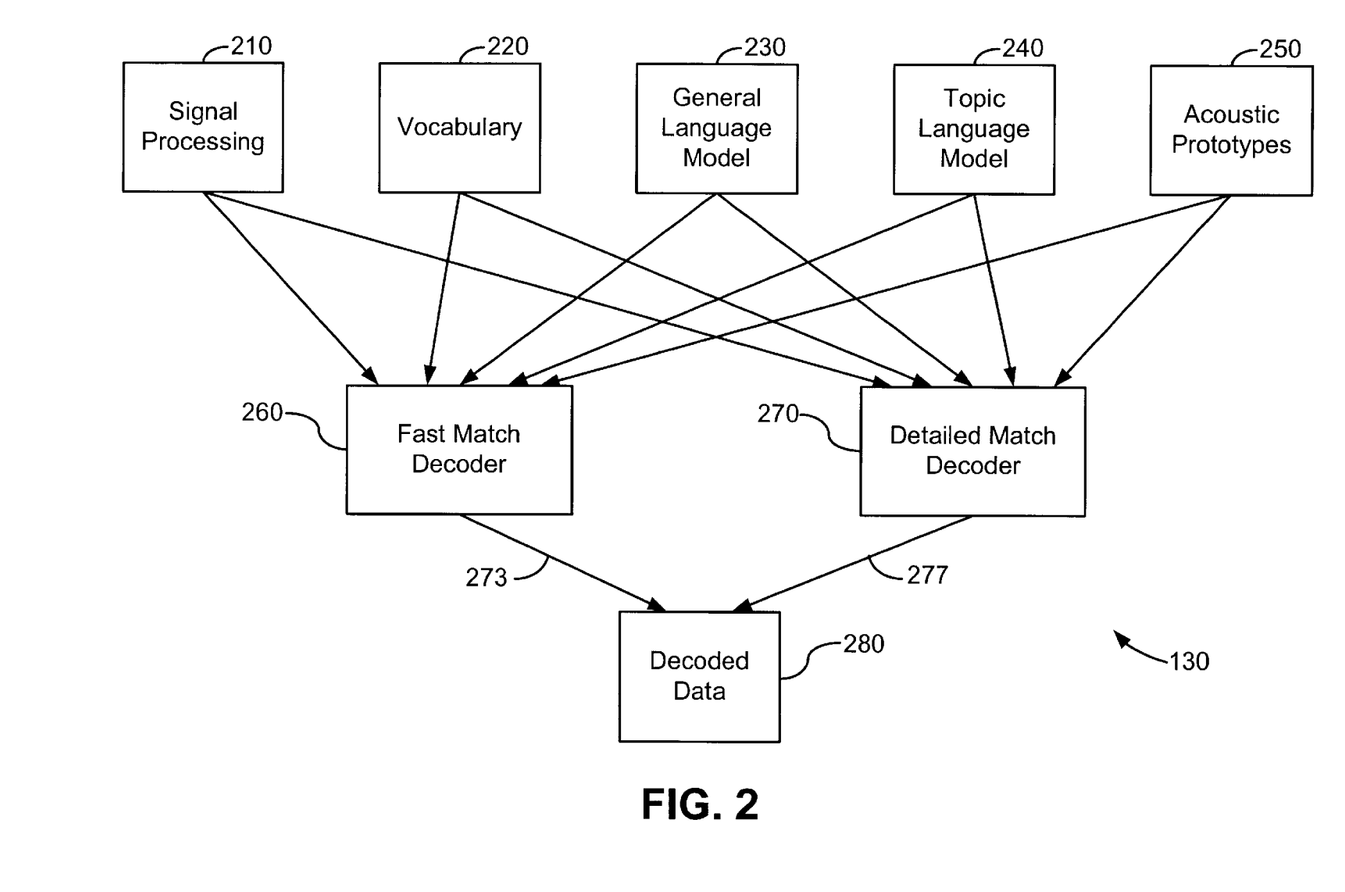
FIG. 2 is a block diagram of an Automatic Speech Recognition (ASR) module in accordance with one embodiment of the present invention.

Referring now to FIG. 2, this figure shows a block diagram of an ASR module 130 in accordance with one embodiment of the present invention. ASR module 130 comprises a signal processing module 210, a vocabulary 220, a general language model 230, a topic language model 240, acoustic prototypes module 250, a fast match decoder 260, a detailed match decoder 270, and decoded data 280.

Audio data is processed by signal processing module 210. As is known in the art, signal processing module 210 can take such steps as sampling the audio signal and partitioning the signal into overlapping frames so that each frame is discretely processed by the remainder of the system. The frames can be provided to a feature extractor, which can extract spectral features from the signal at regular intervals, for example, about every 10 milliseconds. The spectral features are usually in the form of feature vectors, which are then operated on by the fast match decoder 260 and the detailed match decoder 270. Signal processing module 210 performs well known functions.

Vocabulary 220 is also a well known module. In one embodiment of the present invention, vocabulary 220 comprises words and syllables. For example, the vocabulary 220 can contain twenty-thousand of the most frequent English words and five-thousand syllables that cover all possible classes of pronunciation in English of parts of words. This approach allows words to be displayed that are not in the initial vocabulary. However, the words themselves will generally not be displayed, but instead the syllables that make up the words will be displayed. Also in this embodiment, the general language model 230 (also a well known device) can assign language model scores to word/syllable strings. This type of language model, with mixed word/syllable vocabulary, is described in U.S. Pat. No. 6,073,091, by Kavensky et al., "Apparatus and method for forming a filtered inflected language model for automatic speech recognition," issued on Jun. 6, 2000, the disclosure of which is hereby incorporated by reference.

In another embodiment of the present invention, the vocabulary 220 comprises only words, and syllables are produces at later stages of the decoding (such as by separator module 140). The general language model 230 would then assign language model scores to word strings. Which embodiment to use depends on how confidence scores are attached. If the confidence measure is defined for words only, then it is better to use the vocabulary 220 with words only and to map words into syllables if the words have low scores. If it is desired that spoken words that are not in vocabulary 220 be decoded, then a mixture of word/syllables in the vocabulary 220 can be useful. In the latter approach, it is beneficial to use a more sophisticated confidence measure that can be applied to words and syllables. Such a measure is described in reference to FIG. 9 herein.

The topic language model 240 is optional. This model contains statistics and vocabularies that are constrained to some topics. This language model can be used, for instance, in classrooms for lectures on particular subjects such as history, mathematics, or biology. The acoustic prototypes module 250 is used to compute acoustic scores for spoken utterances. The can be several implementations of the acoustics prototype module 250. The acoustics prototype module 250 can consist of hidden Markov models that are trained from training acoustic data. Hidden Markov models can also be made for syllables, as described by the patent application identified by U.S. Pat. Ser. No. 09/663,812, filed Sep. 5, 2000, entitled "Syllable and Morheme-Based Automatic Indexing and Searching Method and Apparatus for Textual Archive Systems," the disclosure of which is hereby incorporated by reference.

Fast match decoder 260 produces a list of candidate words or words/syllables that match the spoken acoustic utterance. A reference that describes a suitable fast match decoder 260 is Gopalakrishnan et al., "Fast Match Techniques," Automatic Speech Recognition, pp. 413–428, 1996, Kluwer Academic (publisher), the disclosure of which is hereby incorporated by reference. The fast match decoder 260 produces a word or word/syllable or even strictly syllable output 273. Syllable decoding can be sufficiently accurate even for fast match decoding. This decoded data 280 can then be sent to a separator module 140, as shown in FIG. 1. Optionally, the output 273 from the fast match decoder can be routed directly to the display controller module 150 (shown in FIG. 1). This can be useful in situations where there are two displays of transcriptions, one that is quickly determined, with possibly more errors, and one that is transcribed through a less error prone process. This allows immediate feedback but also provides for a better transcription as time permits.

The detailed match decoder 270 produces an output 277 that should have improved decoding accuracy as compared to the output 273 produced by the fast match decoder 260. This output 277 can contain a string of words or words and syllables. A reference that discusses detailed matching is Jelineck, "Statistical Methods for Speech Recognition," 1998, the MIT Press, the disclosure of which is hereby incorporated by reference. Decoded data 280 is then able to be sent to the separator module 140 (see FIG. 1 or 3).

Figure 3:
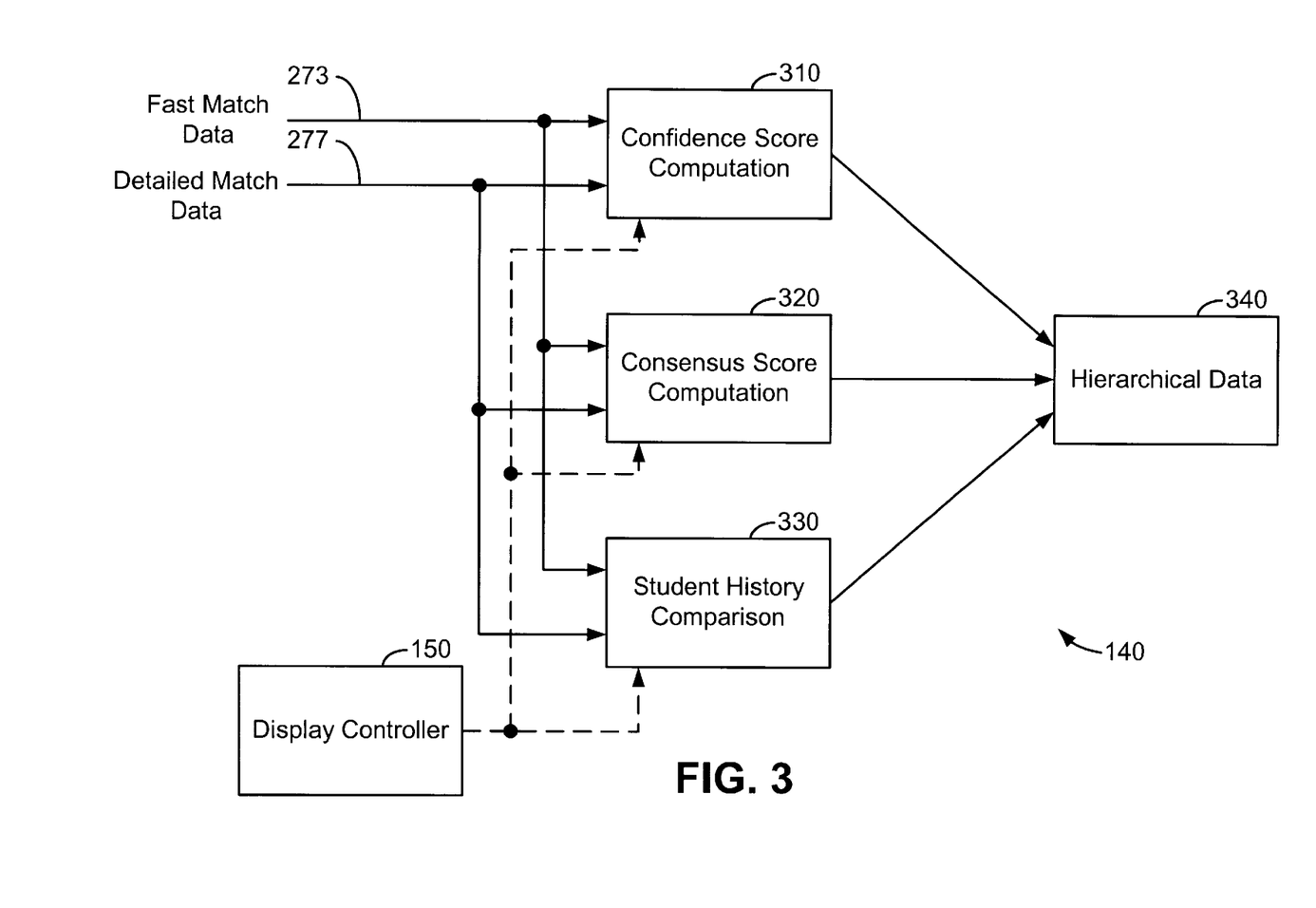
FIG. 3 is a block diagram of a word/syllable/phone separator in accordance with one embodiment of the present invention.

Referring now to FIG. 3, this figure shows a block diagram of a word/syllable/phone separator module 140 in accordance with one embodiment of the present invention. Separator module 140 comprises a confidence score mechanism 310, a consensus computation 320, a student history comparison 330, and hierarchical data 340. The display controller 150 can optionally control aspects of these modules, as shown in FIG. 3 by the connections from the display controller 150 to the modules.

Fast match data 273, which comprises words or words and syllables, and detailed match data 277, which also comprises words or words and syllables, are inputs to modules 310, 320, and 330. It should be noted that all three modules 310 through 330 are not necessarily used in a system at the same time; FIG. 3 is merely representative of the modules that could be used in a speech processing system. This is discussed in more detail below. Confidence score computation module 310 is described in more detail in reference to FIG. 9, but, in general, it attempts to determine confidence per unit of time. This allows the confidence for phones to be determined.

A consensus computation 320 may also be performed. Consensus computations are described in more detail in Mangu et al., "Finding Consensus in Speech Recognition: Word Error Minimization and Other Applications of Confusion Networks," Computer Speech and Language 14, 2000, pp. 373–400, the disclosure of which is hereby incorporated by reference. Basically, a consensus computation tries to find the sequence of words that contains the least number of errors, unlike traditional recognizers that output the most likely sequence of words, i.e., the one that is more likely to be correct as a whole. This is done by taking an independent decision for each word position, by looking in the N-best list of recognizer hypotheses for the words that are most likely (or simply occur most often in the N-best list) at that particular position. Generally, either the confidence score computation 310 will be used or the consensus computation 320 will be used. It is also possible to use both computations, such as inserting the consensus computation before the confidence computation, when it is useful for a given application. The student history comparison 330 may be combined with either module 310 or 320 or can be the only module in separator module 140. The student history comparison 330 is useful for those situations where words have already been learned, such as when a student uses a reading package.

Each of these modules 310 through 330 produces a hierarchical data output 340 that comprises, for example, words, syllables or phones and scores, confidences or probabilities for each. This hierarchical data 340 can be used by display controller 150 to determine what should be displayed.

Which module or group of modules that are chosen depend on the type of application and other factors that are controlled by the display controller 150. For example, if the system is used as a reading tutor, then student history comparison 330 could be used. In this case, the student history comparison 330 contains the information of what words have already been learned by the students. Depending on this information, either words or syllables will be displayed. For instance, words are displayed if they were already learned, or syllables otherwise. The student history comparison may also be used for teaching lip reading, as the student should already know certain words.

The student history comparison 330, when used in conjunction with a reading tutor, works as follows. A student reads text aloud. The text is from a display, and therefore an ASR system using the present invention can determine what the student read. The ASR system decodes what the student said and stores in a buffer words and phones for each acoustic utterance. It compares a phone string (i.e., how the system decoded the speech made by the student) with a correct phone string for the word that is stored in its database. If there is a mismatch between how the student pronounced a word and how the word should be pronounced, the system can display a string of correct phones (above the word) and emphasize the phone or phones that were incorrectly spoken.

For example, the student could read the word CAT and say this same word as "k a p." The system knows from its database that the word CAT should have a phone string "k a t." It can display "k a T" to emphasize that "t" should be read but not "p." It can print the phone string "k a T" above the word CAT on a display.

The system can take into account the student history as follows. The system can determine that a student has learned to read some words well. For example, the student, after he/she was corrected, has started to read CAT as "k a t" for several testing periods. The system can use this information to enhance its decoding. There is some probability that the ASR system makes the decoding error, which means that the student does not make an error when he/she says a word. For example, a student could read the word "CAT" and correctly pronounce it as "k a t," but ASR system could make a mistake and decided that this student spoke "k a p." As previously discussed, the system could know that the student has already learned to read the word CAT correctly. The system could also measure the confidence score for the decoded utterance "k a p" and find that this confidence score is relatively low. Then, the system can decide that it is the ASR system that made an error, rather than the student, and therefore it will not print for a student correction "k a T."

Thus, a confidence score can be enhanced by using history on how likely it is that a student can make a reading mistake. An ASR system using the student history comparison 330 could therefore compare what a student spoke (as a decoded phonetic utterance) with a correct phonetic pronunciation of the word, match a spoken decoded phonetic utterance with the correct phonetic utterance, and identify the mismatched phone. The system could then print a correct phonetic utterance with an emphasized phone that was mismatched. Additionally, if the confidence score for the spoken student phonetic utterance is below some threshold and there is historical evidence that the student has learned to speak the word, then the system would not print a corrected phonetic utterance.

Figure 4:
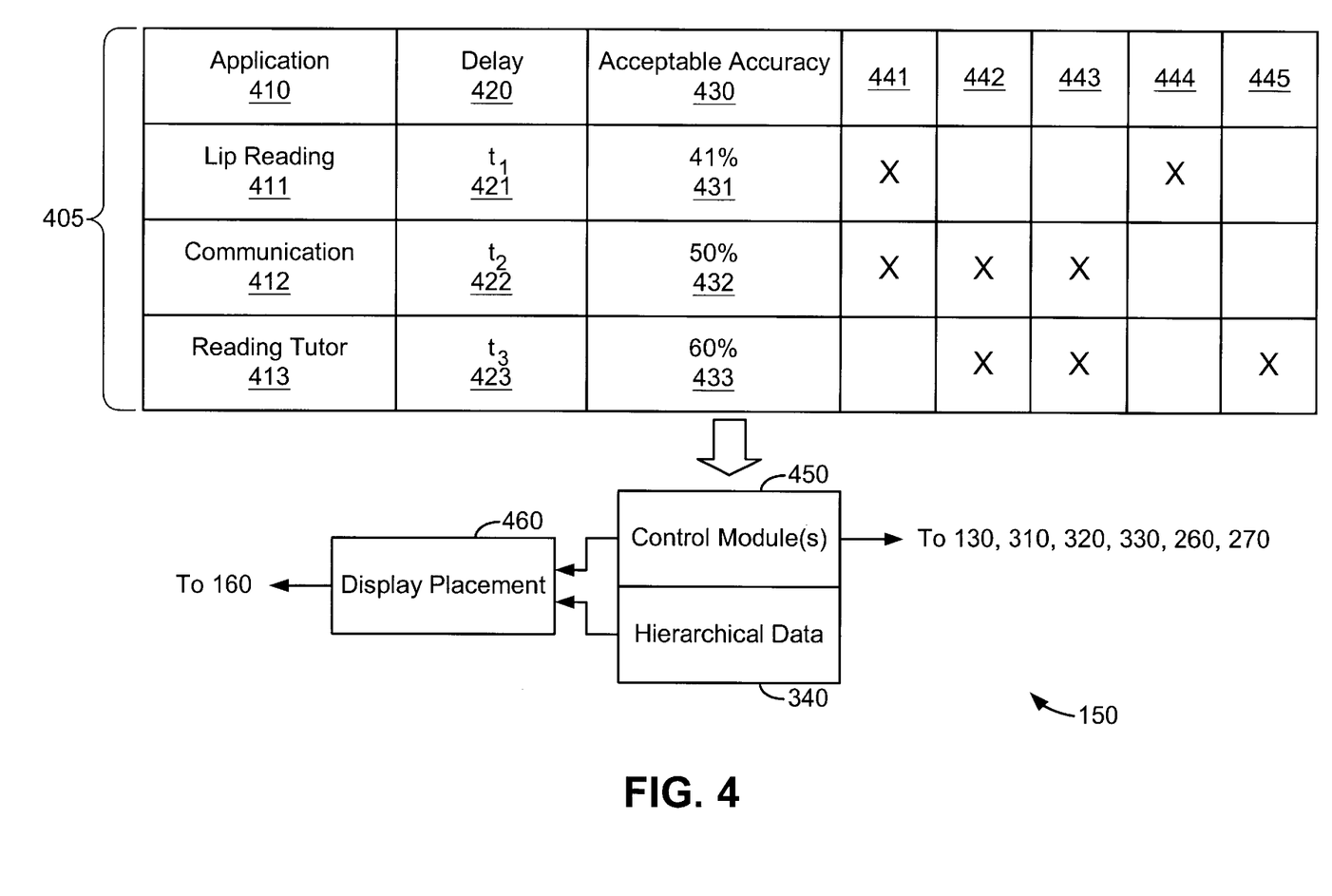
FIG. 4 is a block diagram of a display controller in accordance with one embodiment of the present invention.

Turning now to FIG. 4, a block diagram of a display controller 150 is shown in accordance with one embodiment of the present invention. Display controller 150 comprises a control table 405, a control module or modules 450, hierarchical data 340, and a display placement module 460. Control table 405 allows a user to set criteria for the controller. Such criteria include an application 410, a delay 420, an acceptable accuracy 430, and additional criteria 441 through 445 that enable or disable modules. The additional criteria are as follows, each of which disables or enables its corresponding module: criterion 441 corresponds to the fast match decoder 260; criterion 442 corresponds to the detailed match decoder 270; criterion 443 corresponds to the confidence score computation 310; criterion 444 corresponds to the consensus computation 320; and criterion 445 corresponds to the student history comparison 330. Control table 405 is configured, in this example, for the applications of lip reading 411, communication 412 and reading tutor 413.

Delay 420 indicates the amount of acceptable delay between when a word is spoken and when the word should appear on the display 160. Usually, delays will be on the order of a half a second or less. The acceptable accuracy indicates how accurate the transcription for words must be before the system will change to syllables or phones. As previously discussed, it is beneficial to first determine if a word has a low confidence that does not meet a predetermined acceptance threshold, before displaying syllables (or phones).

When performing a lip reading 411 application, a system will have a delay 421 of $t_1$, an acceptable accuracy 431 of 41 percent, and the fast match decoder 260 and consensus computation 320 modules will be enabled (as indicated by criteria 441 and 444, respectively). When performing a communication 412 application, a system will have a delay 422 of $t_2$, an acceptable accuracy 432 of 50 percent, and the fast match decoder 260, detailed match decoder 270 and confidence score computation 310 modules will be enabled (as indicated by criteria 441, 442 and 443, respectively). When performing a reading tutor 413 application, a system will have a delay 423 of $t_3$, an acceptable accuracy 433 of 60 percent, and the detailed match decoder 270, confidence score computation 310, and student history comparison 330 modules will be enabled (as indicated by criteria 442, 443 and 445, respectively).

Generally, the fast match decoder 260 and other decoding blocks, like detailed match decoder 270, are always working. The fast match decoder 270 should not be eliminated completely, but the fast match decoder 270 can be changed in such a way to print a shorter list of candidate words. The overall acceptable delay should not be shorter that the overall decoding time (including fast match delays). But fast match and other decoding blocks can be adjusted to run faster (e.g., by making a list of fast match words shorter). Thus, criteria 441 and 442 control whether the output from the fast match decoder 260 or the detailed match decoder 270, respectively, is displayed.

The data in control table 405 is used by control module or modules 450, which configure modules ASR 130, fast match decoder 260, detailed match decoder 270, confidence score computation 310, consensus computation 320, student history comparison 330, and display placement module 460. Control module or modules 450 can also perform any other necessary configuration. Display placement module 460 can be configured by the control module(s) 450 to display scrolling text, sliding text, or a combination of these. Possible displays are discussed in reference to FIGS. 5 through 7 below.

Figure 5:
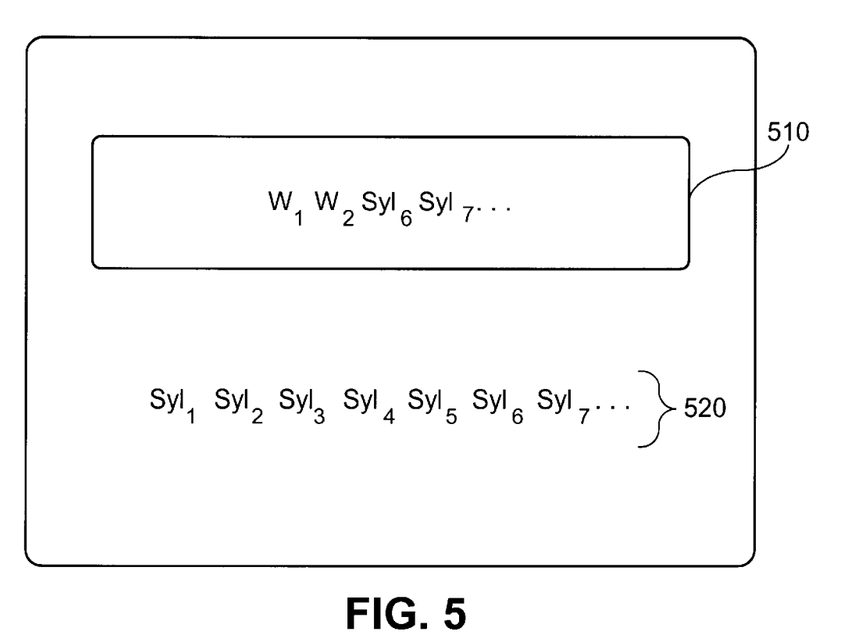
FIGS. 5, 6 and 7 are exemplary displays in accordance with embodiments of the present invention.

Turning now to FIG. 5, a possible display 500 is shown. In display 500, there are two sections. In section 510, a more accurate translation is shown. This translation will generally contain words of high accuracy and, when accuracy is lower, syllables. In section 520, a less accurate translation is shown. This translation could also include words, although in this example, section 520 will only include syllables. Such a display 500 could be used during lip reading, where fast decoding is necessary. In the example of FIG. 5, syllables one and two make up word one, while syllables three through five make up word two. In this version, the translations scroll from left to right.

Figure 6:
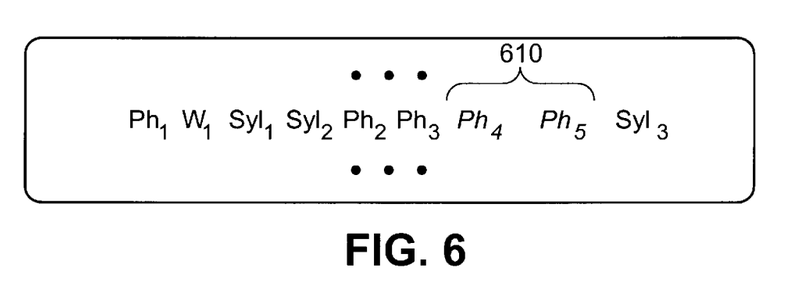

FIG. 6 shows another possible display. In this display, the translations scroll from right to left until a line is filled, then from bottom to top. This is similar to the way credits are shown in a movie. Here, there is a mixture of words, syllables and phones. Phones 610 are low probability phones that are indicated as such through certain display techniques, such as placing the low probability phones in parenthesis. Other ways to do this would be to have the high probability items be highlighted or displayed in a different font (bold, underline) and the low probability items displayed less prominently (for example, in italics or in gray). In FIG. 6, the low probability phones are italicized.

Figure 7:
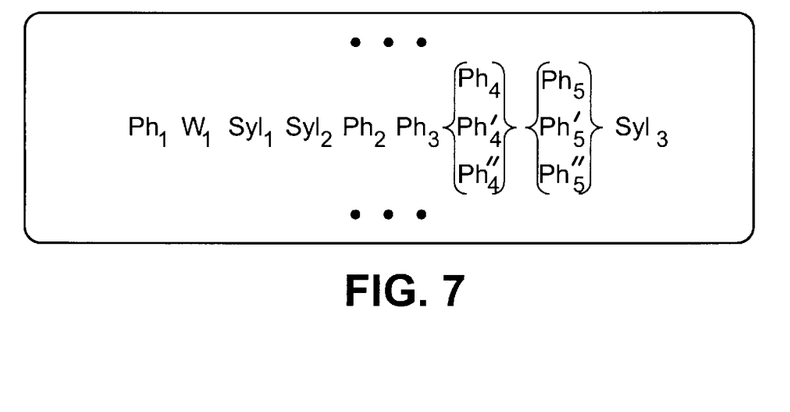

FIG. 7 shows another display possibility. In this display, the possible phones are listed in each appropriate location. Generally, these would be ordered with the highest confidence phones at the top and the lower confidence phones at the bottom. It should be noted that this type of display could also occur with words, syllables and phones. For instance, if a word has a low confidence that does not meet the acceptance threshold and, during the same time span as the word, two syllables are chosen as meeting the syllable acceptance thresholds, the word and two syllables could be displayed as shown in FIG. 7. This could allow the user to make the decision as to the proper translation, as the user could choose between the word or the syllables.

The confidence threshold used at each level (word, syllable or phone) to decide whether to display as is or to break up into lower level elements is chosen by balancing the benefit of displaying the higher level representation and the potential cost of displaying an incorrect item at that level.

Figure 8:
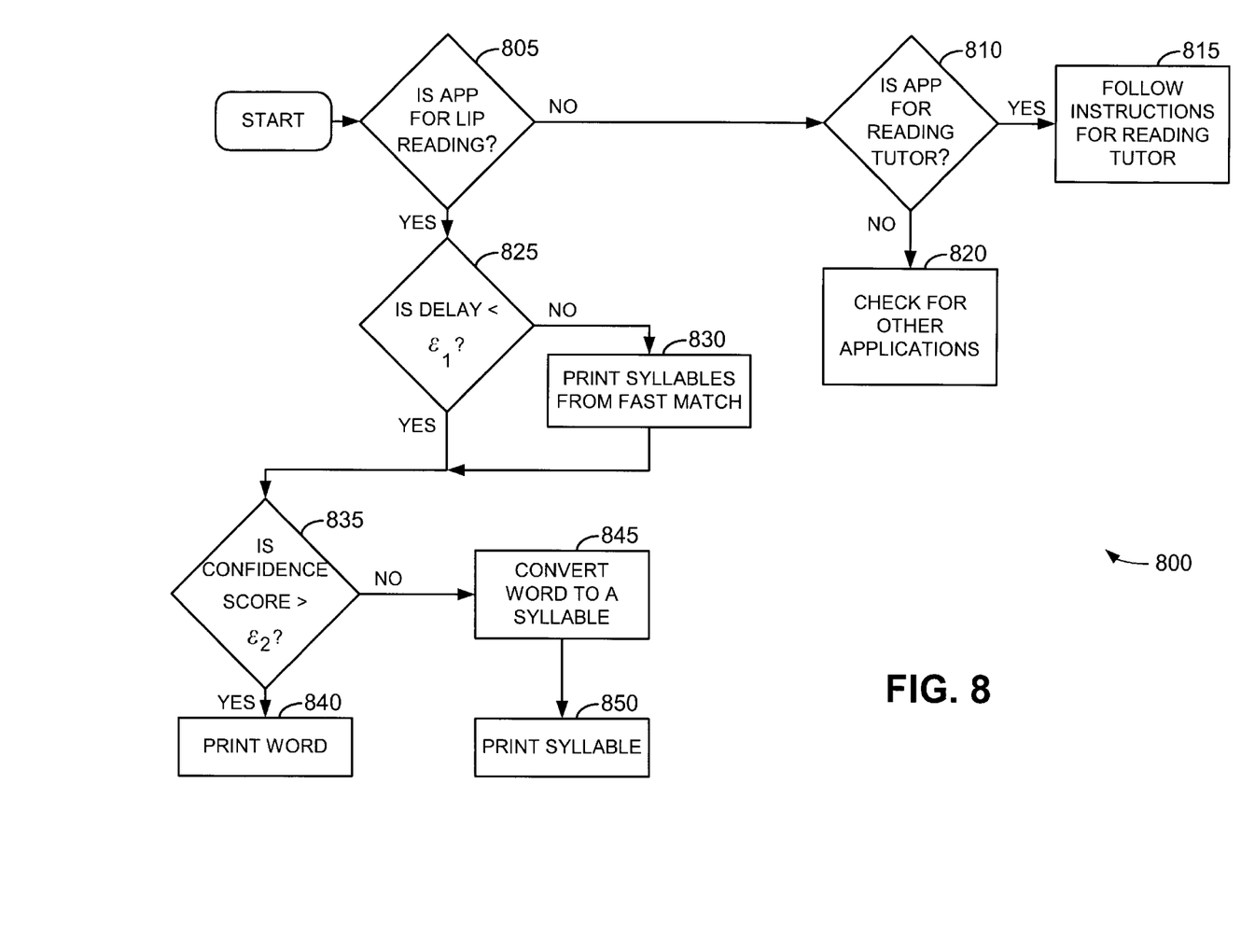
FIG. 8 is a flow chart of a method for word/syllable processing, in accordance with one embodiment of the present invention.

Referring now to FIG. 8, a method 800 is shown for word/syllable processing, in accordance with one embodiment of the present invention. Method 800 is performed whenever it is desired that more accurate syllables be displayed if words corresponding to the symbols do not meet a certain accuracy threshold. It should be noted that a word may be transcribed that does not correspond to the syllables that are transcribed for the same time period. In other words, the syllables that are considered the most likely syllables for a time period may not actually correspond to the word that is considered the most likely for that period.

Method 800 begins in step 805, when it is determined if the application is for lip reading. As previously discussed, the application settings can be configured through the display controller 150. If the application is for lip reading (step 805=YES), then it is determined if the delay between printing decoded data from the detailed match list is less than a predetermined threshold (step 825). If the delay is not less than a predetermined threshold delay (step 825=NO), a syllable will be printed to the display from the fast match decoder. The delay threshold, as discussed in reference to FIG. 4, is configurable by a user. If the delay is less than a predetermined threshold delay (step 825=YES), then it is determine if the confidence score is greater than a predetermined confidence (step 835). If so (step 835=YES), then the word is printed to the display (step 840). If the confidence score is less than a predetermined confidence (step 835=NO), then the word is converted to a syllable (step 845) and the syllable is printed to the display (step 850).

If the application does not entail lip reading (step 805=NO), it is next determined if the application is for a reading tutor (step 810). If the application is for a reading tutor, then the instructions, as indicated by control table 405 of display controller 150 (see FIG. 4) are carried out (step 815). This series of steps will be very similar to those described for lip reading, such as steps 825 to 850. For a reading tutor application, the fast match decoder may not be used, which means that step 825 would not be used. However, words or syllables would be selected for display based on confidence levels for these parts of speech. If the application is not being used as a reading tutor (step 810=NO), then it is checked to see whether the system is being used for another application, as defined by control table 405 of display controller 150 (show in FIG. 4). The other criteria (as determined by control table 405) for the particular application would be set and executed.

It should be noted that method 800 may be modified to include the display of phones if syllable decoding does not reach a predetermined accuracy level.

Figure 9:
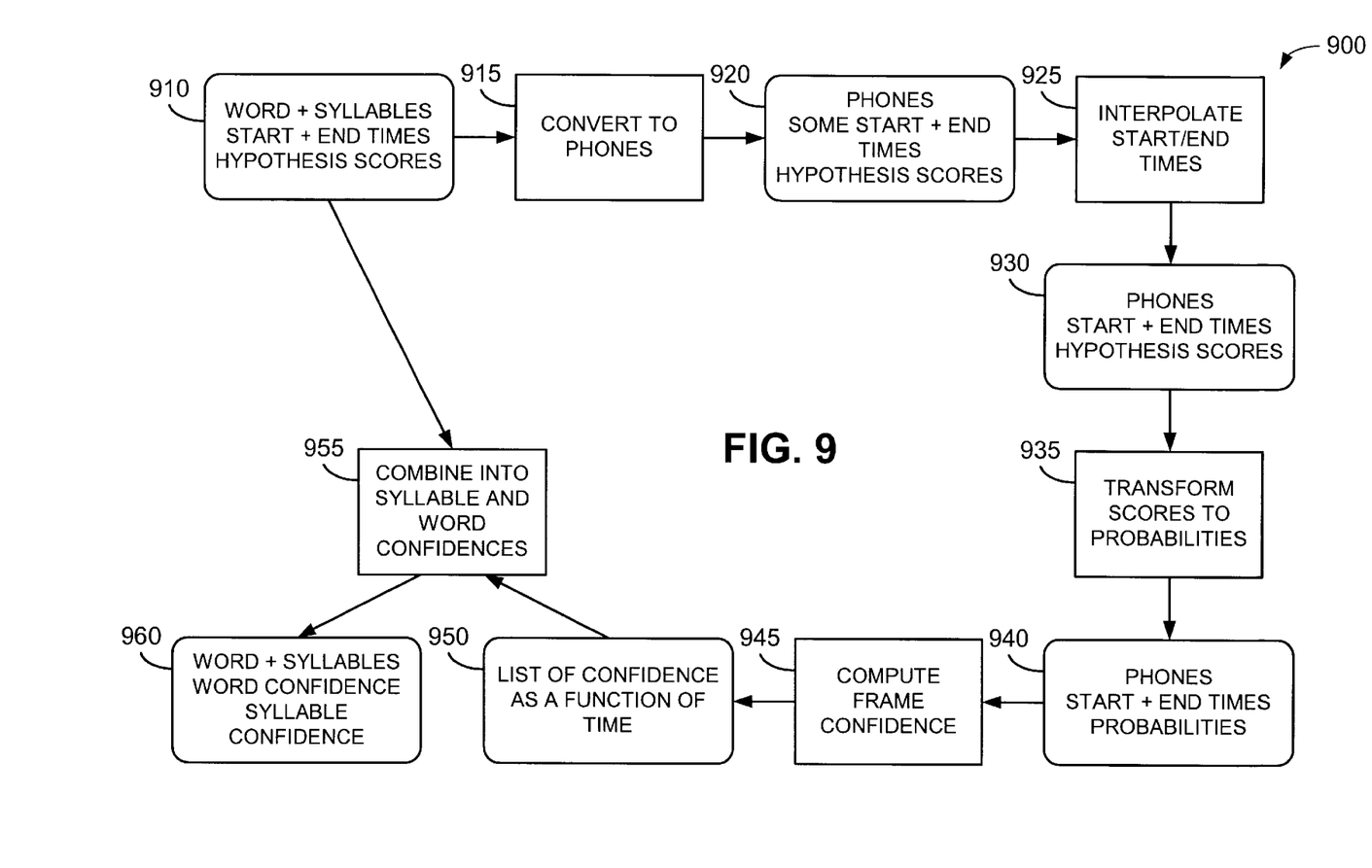
FIG. 9 is a block diagram of a method and various N-best list contents that occur during the method, in accordance with one embodiment of the present invention.

Turning now to FIG. 9, a block diagram of a method 900, and various N-best list contents that occur during the method 900, is shown in accordance with one embodiment of the present invention. Method 900 is used to determine confidence as a function of time, which can then be used to determine which part of speech (words or syllables, and optionally phones) is the most probable translation. Method 900 applies when the output of ASR is a mixed output of words and syllables (and possibly phones). In FIG. 9, even numbers correspond to the contents of an N-best list, and odd numbers correspond to method steps performed on the N-best list. It should be noted that the N-best lists can contain additional information than what is shown here.

In N-best list 910, this list comprises words and syllables, start and end times and hypothesis scores for the words and symbols. This is the N-best list that should occur after the ASR 130 is executed. It should be noted that the system may also contain words only at this juncture. In step 915, the words and syllables are converted into a corresponding sequence of phones. The first phone of each token in the original hypothesis inherits the start time of that token. The last phone of each token in the original hypothesis inherits the end time of that token. At this point, a temporary N-best list 920 will contain phones, some start and end times, and hypothesis scores. In step 925, the missing start and end times for the top hypothesis phones are filled in by interpolating existing times, so that all phone originating from the same token in the original hypothesis are given the same duration. The missing start and end times for the phones of the remaining N-1 hypotheses are filled in as follows. Each of those N-1 sequences of phones is aligned with the top one by minimizing the edit (or Levehnstein) distance between the two. Each phone in the sequence is identified as matching, inserted or substituted, with respect to the top hypothesis. For matching phones, start and end times are copied from the top hypothesis to the hypothesis under consideration. For sequences of inserted or substituted phones, start and end times are set to be evenly spaced between the times that have already been determined.

After step 925, the temporary N-best list will contain phones, start and end times and hypothesis scores (this is N-best list 930). In step 935, the hypothesis score of each hypothesis multiplied by a scaling factor and an exponential is taken. These are standard steps in speech analysis. Other non-linear monotone increasing functions may also be used. The transformed scores are then normalized by dividing each of them by their sum. These numbers will be referred to as the probabilities of the hypotheses. At this point, the N-best list contains phones, and start/end times and probabilities for each complete hypothesis (as indicated by N-best list 940). Concerning the probabilities, if there is a 10-best list, there will be 10 probabilities that sum to one.

In step 945, the frame confidences are calculated. For each time frame t, a frame confidence is computed by adding the probabilities of all the hypotheses (including the top hypothesis) for which the phone hypothesized at time t matches the phone hypothesized at time t in the top hypothesis. At this point, the N-best list contains confidence as a function of time (as indicated by N-best list 950). It should be noted that the N-best list can contain all of the items previously mentioned, such as phones, start and end times, and probabilities.

In step 955, the two N-best lists 910 and 950 are combined into syllable and word (and optionally phone) confidences, which results in N-best list 960. Basically, each frame confidence is averaged over a part of speech to determine the confidence for that part of speech. For instance, if a phone spans three frames, then the confidence assigned to the phone will be the average of the confidences for the three frames. Similarly, if a word spans ten frames, then the confidence assigned to the word will be the average of the confidences for each of the ten frames. Using the average of the confidences of the spanned frames is one way of determining the confidence for a part of speech. Other methods may, however, be used. For example, a geometric average or the minimum or maximum of the frame confidence over the duration of the part of speech may be used.

If desired in method 900, confidence scores can be assigned to all phones of all N hypotheses. The frame confidence of hypothesis number i is computed by adding the probabilities of all the hypotheses (including the hypothesis number i) for which the phone hypothesized at time t, matches the phone hypothesized at time t in hypothesis number i. Then, confidence for all phones of hypothesis number i are computed by combining frame confidence scores as described for the top hypothesis.

By determining and using a measure of confidence as a function of time, method 900 allows confidences of phones, syllables, and words to be determined through one method. It should be noted that the results of method 900 may be combined with other results to provide another level of confidence measurement. For example, the language model score or acoustic model score used by ASR 130 may be combined with a confidence 900.

Figure 10:
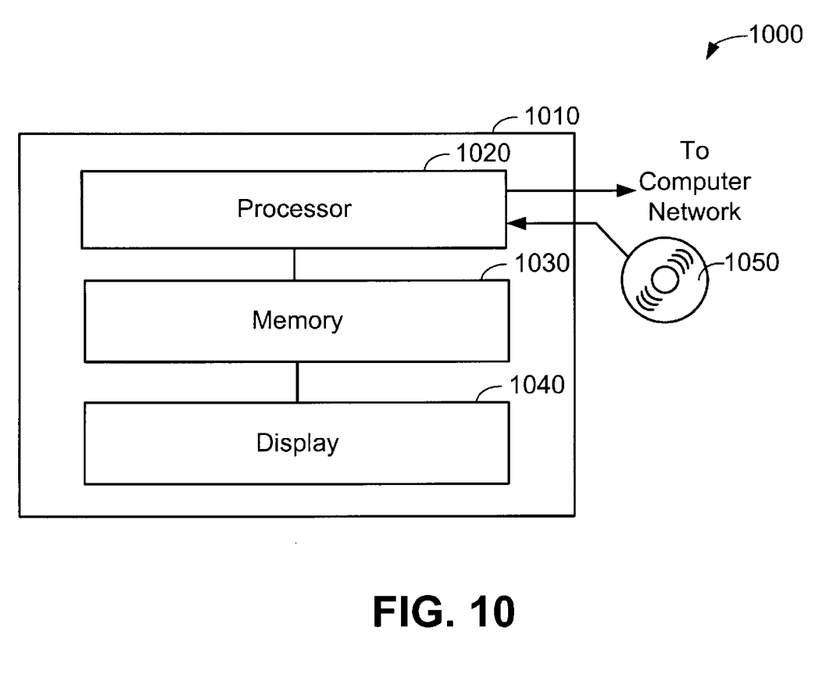
FIG. 10 is block diagram of an exemplary system suitable for executing embodiments of the present invention.

Referring now to FIG. 10, an exemplary system is shown that is suitable for executing embodiments of the present invention. System 1000 comprises a computer system 1010 and a Compact Disk (CD) 1050. Computer system 1010 comprises a processor 1020, a memory 1030 and a display 1040.

As is known in the art, the methods and apparatus discussed herein may be distributed as an article of manufacture that itself comprises a computer readable medium having computer readable code means embodied thereon. The computer readable program code means is operable, in conjunction with a computer system such as computer system 1010, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 1050.

Memory 1030 will configure the processor 1020 to implement the methods, steps, and functions disclosed herein. The memory 1030 could be distributed or local and the processor 1020 could be distributed or singular. The memory 1030 could be implemented as an electrical, magnetic or optical memory, or any combination of these or other types of storage devices. Moreover, the term "memory" should be construed broadly enough to encompass any information able to be read from or written to an address in the addressable space accessed by processor 1010. With this definition, information on a network is still within memory 1030 because the processor 1020 can retrieve the information from the network. It should be noted that each distributed processor that makes up processor 1030 will generally contain its own addressable memory space. It should also be noted that some of all of computer system 1010 can be incorporated into an application-specific or general-use integrated circuit.

Display 1040 is any type of display suitable for producing the types of hierarchical information shown in FIGS. 5 through 7. Generally, display 1040 will be a computer monitor or other similar video display.

Thus, what has been shown are methods and systems for displaying, in a hierarchical fashion, parts of speech. During speech recognition, a system in accordance with the present invention can determine the most probably part of speech and display the appropriate word, syllable or phone. The present invention also provides a unique way of determining confidence as a measure of time that allows confidences of any part of speech (word, syllable, phone, or any other snippet of speech) to be easily determined.

It is to be understood that the embodiments and variations shown and described herein are merely illustrative of the principles of this invention and that various modifications may be implemented by those skilled in the art without departing from the scope and spirit of the invention. For instance, separator module 140 can comprise additional or different modules to separate words from syllables (and syllables from phones, if desired).

What is claimed is:

1. A method for hierarchical transcription and display of input speech, the method comprising the steps of:

converting a speech portion to a word;

determining a confidence of the word;

displaying the word if the confidence of the word meets a threshold confidence; and displaying at least one syllable, corresponding to the word, if the confidence of the word does not meet the threshold confidence.

2. The method of claim 1, wherein the step of displaying at least one syllable comprises the steps of:

determining a confidence of the at least one syllable; and displaying at least one phone that corresponds to the at least one syllable if the confidence of the at least one syllable does not meet a threshold confidence.

3. A method comprising the steps of:

providing a recognized sentence portion comprising words and syllables;

transforming a plurality of hypothesis scores of the recognized sentence portion to phone level;

determining, by using the transformed hypothesis scores, confidence of the recognized sentence portion as a function of time; and using the confidence as a function of time to determine confidences for parts of speech in the recognized sentence portion.

4. The method of claim 3, further comprising the steps of:

providing a history comprising words already learned by a student; and using the history to determine how likely it is that a student made a reading mistake.

5. The method of claim 4, wherein:

the method further comprises the steps of:

determining, by using confidence as a function of time, a series of phones in the recognized sentence portion, where each phone in the series is selected as a most likely phone;

determining a correct phonetic pronunciation of a word; and determining if phones in the series that correspond to the word match the correct phonetic pronunciation of the word; and the step of using the history to determine how likely it is that a student made a reading mistake further comprises the steps of:

if a confidence score of one or more of the phones is below a predetermined phone confidence and if the word is marked as previously learned, displaying the correct phonetic pronunciation; and if a confidence score of one or more of the phones is below a predetermined phone confidence and if the word is not marked as previously learned, displaying the correct phonetic pronunciation and emphasizing the phones that are incorrect.

6. The method of claim 3, further comprising the steps of:

determining, by using confidence as a function of time, a series of phones in the recognized sentence portion, where each phone in the series is selected as a most likely phone;

determining a correct phonetic pronunciation of a word;

determining if phones in the series that correspond to the word match the correct phonetic pronunciation of the word; and if one or more of the phones are incorrect, displaying the correct phonetic pronunciation of the word and emphasizing the phones that are incorrect.

7. The method of claim 3, wherein:

the step of transforming a plurality of hypothesis scores of the recognized sentence portion to phone level further comprises the steps of:

determining a plurality of hypotheses for a recognized sentence portion;

converting the plurality of hypotheses into a sequence of phones;

determining a probability from each hypothesis score; and determining start and end times for each phone, whereby the probabilities may be assigned to each phone and the hypothesis scores are thereby transformed to phone level; and wherein the step of determining confidence as a function of time comprises the steps of:

associating a number of hypotheses, associated probabilities and phones with each of a plurality of frames; and computing, for each frame, a frame confidence by adding probabilities of all hypotheses for which a phone hypothesized at time t matches a phone hypothesized at time t in a top hypothesis.

8. The method of claim 3, wherein the step of using the confidence as a function of time to determine confidences for parts of speech in the recognized sentence portion further comprises the steps of, for each part of speech of interest:

selecting a part of speech that spans a time period;

determining an average confidence over that time period; and equating the average confidence over that time period as the confidence of the part of speech.

9. The method of claim 8, further comprising the step of combining, for each part of speech of interest, the confidence of this part of speech with one or more additional confidences of this part of speech determined through other methods.

10. The method of claim 3, wherein the parts of speech comprise words, syllables and phones.

11. A method for hierarchical transcription and display of input speech, the method comprising the steps of:
  determining for a speech portion which of a plurality of parts of speech meets predetermined criteria for that part of speech; and
  displaying the part of speech that meets the predetermined criteria for that part of speech.

12. The method of claim 11, wherein:
  the step of determining for a decoded speech portion which of a plurality of parts of speech meets predetermined criteria for that part of speech comprises the step of determining if a word determined from the speech portion meets a predetermined word confidence; and
  the step of displaying the part of speech that meets the predetermined criteria for that part of speech comprises the step of displaying the word if the word meets the predetermined word confidence.

13. The method of claim 12, wherein:
  the step of determining for a decoded speech portion which of a plurality of parts of speech meets predetermined criteria for that part of speech further comprises the step of if the word does not meet the predetermined word confidence, determining if at least one syllable that comprises the word and that is determined from the speech portion meets a predetermined syllable confidence; and
  the step of displaying the part of speech that meets the predetermined criteria for that part of speech comprises the step of if the word does not meet the predetermined word confidence, displaying the at least one syllable if the at least one syllable meets the predetermined syllable confidence.

14. The method of claim 13, wherein:
  the step of determining for a decoded speech portion which of a plurality of parts of speech meets predetermined criteria for that part of speech further comprises the step of if the word does not meet the predetermined word confidence, determining if each of the at least one syllables that comprises the word and that is determined from the speech portion meets a predetermined syllable confidence; and
  the step of displaying the part of speech that meets the predetermined criteria for that part of speech comprises the steps of if the word does not meet the predetermined word confidence, displaying at least one phone for each of the at least one syllables that does not meet the predetermined syllable confidence.

15. The method of claim 11, wherein the plurality of parts of speech comprise words, syllables or phones.

16. The method of claim 11, wherein:
  the step of determining for a speech portion which of a plurality of parts of speech meets predetermined criteria for that part of speech further comprises the steps of:
    determining confidence as a function of time for the speech portion;
    determining a confidence for a word by determining an average confidence of a time period spanned by the word; and
    determining if the confidence of the word meets a predetermined word confidence; and
  the step of displaying the part of speech that meets the predetermined criteria for that part of speech comprises the steps of:
    displaying the word if the confidence of the word meets the predetermined word confidence; and
    displaying at least one syllable that corresponds to the word if the confidence of the word does not meet the predetermined word confidence.

17. The method of claim 16, wherein:
  the step of determining for a speech portion which of a plurality of parts of speech meets predetermined criteria for that part of speech further comprises the steps of:
    determining a confidence for each of the at least one syllables that correspond to the word by determining an average confidence for each syllable, wherein each syllable spans a time period that is equal to or less than the time period spanned by the word; and
    determining if the confidence for each syllable meets a predetermined syllable confidence; and
  the step of displaying the part of speech that meets the predetermined criteria for that part of speech further comprises the steps of:
    for each of the syllables, displaying a syllable if the confidence of the syllable meets the predetermined syllable confidence; and
    for each of the syllables, displaying at least one phone that corresponds to the syllable if the confidence of the syllable does not meet the predetermined syllable confidence.

18. A system comprising:
  a memory that stores computer-readable code; and
  a processor operatively coupled to the memory, the processor configured to implement the computer-readable code, the computer-readable code configured to:
    provide a recognized sentence portion comprising words and syllables;
    transform a plurality of hypothesis scores of the recognized sentence portion to phone level;
    determine, by using the transformed hypothesis scores, confidence of the recognized sentence portion as a function of time; and
    use the confidence as a function of time to determine confidences for parts of speech in the recognized sentence portion.

19. The system of claim 18, wherein the computer-readable code is further configured to:
  provide a history comprising words already learned by a student; and
  use the history to determine how likely it is that a student made a reading mistake.

20. The system of claim 19, wherein:
  the computer-readable code is further configured to:
    determine, by using confidence as a function of time, a series of phones in the recognized sentence portion, where each phone in the series is selected as a most likely phone;
    determine a correct phonetic pronunciation of a word; and
    determine if phones in the series that correspond to the word match the correct phonetic pronunciation of the word; and
  the computer-readable code is further configured, when using the history to determine how likely it is that a student made a reading mistake further, to:
    if a confidence score of one or more of the phones is below a predetermined phone confidence and if the word is marked as previously learned, display the correct phonetic pronunciation; and
    if a confidence score of one or more of the phones is below a predetermined phone confidence and if the word is not marked as previously learned, display the correct phonetic pronunciation and emphasize the phones that are incorrect.

21. The system of claim 18, wherein:
the computer-readable code is further configured, when transforming a plurality of hypothesis scores of the recognized sentence portion to phone level, to:
determine a plurality of hypotheses for a recognized sentence portion;
convert the plurality of hypotheses into a sequence of phones;
determine a probability from each hypothesis score; and
determine start and end times for each phone, whereby the probabilities may be assigned to each phone and the hypothesis scores are thereby transformed to phone level; and
the computer-readable code is further configured, when determining confidence as a function of time, to:
associate a number of hypotheses, associated probabilities and phones with each of a plurality of frames; and
compute, for each frame, a frame confidence by adding probabilities of all hypotheses for which a phone hypothesized at time t matches a phone hypothesized at time tin a top hypothesis.

22. The system of claim 18, wherein the computer-readable code is further configured, when using the confidence as a function of time to determine confidences for parts of speech in the recognized sentence portion, to, for each part of speech of interest:
select a part of speech that spans a time period;
determine an average confidence over that time period; and
equate the average confidence over that time period as the confidence of the part of speech.

23. The system of claim 22, wherein the computer-readable code is further configured to combine, for each part of speech of interest, the confidence of this part of speech with one or more additional confidences for this part of speech determined through other methods.

24. The system of claim 18, wherein the parts of speech comprise words, syllables and phones.

25. A system for hierarchical transcription and display of input speech, the system comprising:
a memory that stores computer-readable code; and
a processor operatively coupled to the memory, the processor configured to implement the computer-readable code, the computer-readable code configured to:
determine for a speech portion which of a plurality of parts of speech meets predetermined criteria for that part of speech; and
display the part of speech that meets the predetermined criteria for that part of speech.

26. The system of claim 25, wherein:
the computer-readable code is further configured, when determining for a decoded speech portion which of a plurality of parts of speech meets predetermined criteria for that part of speech, to determine if a word determined from the speech portion meets a predetermined word confidence; and
the computer-readable code is further configured, when displaying the part of speech that meets the predetermined criteria for that part of speech, to display the word if the word meets the predetermined word confidence.

27. The system of claim 26, wherein:
the computer-readable code is further configured, when determining for a decoded speech portion which of a plurality of parts of speech meets predetermined criteria for that part of speech, to, if the word does not meet the predetermined word confidence, determine if at least one syllable that comprises the word and that is determined from the speech portion meets a predetermined syllable confidence; and
the computer-readable code is further configured, when displaying the part of speech that meets the predetermined criteria for that part of speech, to, if the word does not meet the predetermined word confidence, display the at least one syllable if the at least one syllable meets the predetermined syllable confidence.

28. The system of claim 27, wherein:
the computer-readable code is further configured, when determining for a decoded speech portion which of a plurality of parts of speech meets predetermined criteria for that part of speech, to, if the word does not meet the predetermined word confidence, determine if each of the at least one syllables that comprises the word and that is determined from the speech portion meets a predetermined syllable confidence; and
the computer-readable code is further configured, when displaying the part of speech that meets the predetermined criteria for that part of speech, to, if the word does not meet the predetermined word confidence, display at least one phone for each of the at least one syllables that does not meet the predetermined syllable confidence.

29. The system of claim 25, wherein the plurality of parts of speech comprise words, syllables or phones.

30. An article of manufacture comprising:
a computer-readable medium having computer-readable code embodied thereon, the computer-readable code comprising:
a step to provide a recognized sentence portion comprising words and syllables;
a step to transform a plurality of hypothesis scores of the recognized sentence portion to phone level;
a step to determine, by using the transformed hypothesis scores, confidence of the recognized sentence portion as a function of time; and
a step to use the confidence as a function of time to determine confidences for parts of speech in the recognized sentence portion.

31. The article of manufacture of claim 30, wherein the computer-readable code further comprises:
a step to provide a history comprising words already learned by a student; and
a step to use the history to determine how likely it is that a student made a reading mistake.

32. The article of manufacture of claim 31, wherein:
the computer-readable code further comprises:
a step to determine, by using confidence as a function of time, a series of phones in the recognized sentence portion, where each phone in the series is selected as a most likely phone;
a step to determine a correct phonetic pronunciation of a word; and
a step to determine if phones in the series that correspond to the word match the correct phonetic pronunciation of the word; and
the computer-readable code further comprises, when using the history to determine how likely it is that a student made a reading mistake further:
a step to if a confidence score of one or more of the phones is below a predetermined phone confidence and if the word is marked as previously learned, display the correct phonetic pronunciation; and a step to if a confidence score of one or more of the phones is below a predetermined phone confidence and if the word is not marked as previously learned, display the correct phonetic pronunciation and emphasize the phones that are incorrect.

33. The article of manufacture of claim 30, wherein:

the computer-readable code further comprises, when transforming a plurality of hypothesis scores of the recognized sentence portion to phone level:

a step to determine a plurality of hypotheses for a recognized sentence portion;

a step to convert the plurality of hypotheses into a sequence of phones;

a step to determine a probability from each hypothesis score; and a step to determine start and end times for each phone, whereby the probabilities may be assigned to each phone and the hypothesis scores are thereby transformed to phone level; and the computer-readable code further comprises, when determining confidence as a function of time:

a step to associate a number of hypotheses, associated probabilities and phones with each of a plurality of frames; and a step to compute, for each frame, a frame confidence by adding probabilities of all hypotheses for which a phone hypothesized at time t matches a phone hypothesized at time t in a top hypothesis.

34. The article of manufacture of claim 30, wherein the computer-readable code further comprises, when using the confidence as a function of time to determine confidences for parts of speech in the recognized sentence portion, for each part of speech of interest:

a step to select a part of speech that spans a time period;

a step to determine an average confidence over that time period; and a step to equate the average confidence over that time period as the confidence of the part of speech.

35. The article of manufacture of claim 34, wherein the computer-readable code further comprises a step to combine, for each part of speech of interest, the confidence of this part of speech with one or more additional confidences for this part of speech determined through other methods.

36. The article of manufacture of claim 34, wherein the parts of speech comprise words, syllables and phones.

37. An article of manufacture comprising:

a computer-readable medium having computer-readable code embodied thereon, the computer-readable code comprising:

a step to determine for a speech portion which of a plurality of parts of speech meets predetermined criteria for that part of speech; and a step to display the part of speech that meets the predetermined criteria for that part of speech.

38. The article of manufacture of claim 37, wherein:

the computer-readable code further comprises, when determining for a decoded speech portion which of a plurality of parts of speech meets predetermined criteria for that part of speech, a step to determine if a word determined from the speech portion meets a predetermined word confidence; and the computer-readable code further comprises, when displaying the part of speech that meets the predetermined criteria for that part of speech, a step to display the word if the word meets the predetermined word confidence.

39. The article of manufacture of claim 38, wherein:

the computer-readable code further comprises, when determining for a decoded speech portion which of a plurality of parts of speech meets predetermined criteria for that part of speech, a step to, if the word does not meet the predetermined word confidence, determine if at least one syllable that comprises the word and that is determined from the speech portion meets a predetermined syllable confidence; and the computer-readable code further comprises, when displaying the part of speech that meets the predetermined criteria for that part of speech, a step to, if the word does not meet the predetermined word confidence, display the at least one syllable if the at least one syllable meets the predetermined syllable confidence.

40. The article of manufacture of claim 39, wherein:

the computer-readable code further comprises, when determining for a decoded speech portion which of a plurality of parts of speech meets predetermined criteria for that part of speech, a step to, if the word does not meet the predetermined word confidence, determine if each of the at least one syllables that comprises the word and that is determined from the speech portion meets a predetermined syllable confidence; and the computer-readable code further comprises, when displaying the part of speech that meets the predetermined criteria for that part of speech, a step to, if the word does not meet the predetermined word confidence, display at least one phone for each of the at least one syllables that does not meet the predetermined syllable confidence.

41. The article of manufacture of claim 37, wherein the plurality of parts of speech comprise words, syllables or phones.

* * * * *